United States Patent [19]

Keller et al.

[11] 4,259,471
[45] Mar. 31, 1981

[54] POLYPHENYLETHER-BRIDGED POLYPHTHALOCYANINE

[75] Inventors: Teddy M. Keller, Alexandria, Va.; James R. Griffith, Riverdale Heights, Md.

[73] Assignee: The United States of America as represented by the Secretary of the Navy, Washington, D.C.

[21] Appl. No.: 42,176

[22] Filed: May 24, 1979

[51] Int. Cl.³ .............................. C08G 73/06
[52] U.S. Cl. ...................... 528/9; 260/465 F; 260/465 H; 528/166; 528/206; 528/210; 528/271
[58] Field of Search ............... 528/9, 166, 206, 210, 528/271; 260/465 F, 465 H

[56] References Cited

U.S. PATENT DOCUMENTS

| 3,926,629 | 12/1975 | Weizl | 528/9 |
| 4,056,560 | 11/1977 | Griffith et al. | 260/465 D |
| 4,057,569 | 11/1977 | Griffith et al. | 260/465 E |
| 4,136,107 | 1/1978 | Griffith et al. | 260/465 E |

*Primary Examiner*—Lester L. Lee
*Attorney, Agent, or Firm*—R. S. Sciascia; William T. Ellis; Thomas McDonnell

[57] ABSTRACT

Polyphthalocyanine resins are obtained by heating, at a temperature from about 240° C. to 305° C., one or more bisorthodinitriles of the general formula:

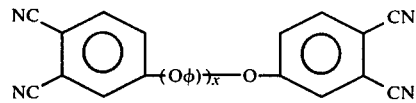

wherein x is from 1 to 10 and the phenyl groups are attached at the meta or para position. These resins have exceptional thermal stability and oxidative resistance making them particularly useful in high-temperature structural composites.

10 Claims, No Drawings

POLYPHENYLETHER-BRIDGED POLYPHTHALOCYANINE

BACKGROUND OF THE INVENTION

The present invention pertains generally to high-temperature resins and in particular to cyano-addition resins of oxyarylbisorthodinitriles.

It is known that certain bisorthodinitriles polymerize to form strong, high-temperature thermosetting resins. Examples of bisorthodinitriles suitable for producing these resins are disclosed in U.S. Pat. Nos. 4,056,560, 4,057,569, and 4,136,107 by James R. Griffith and Jacques G. O'Rear.

The structure of these resins is not completely known. For the following reasons, the principal mechanism of formation is theorized to be phthalocyanine nucleation. As the bisorthodinitriles polymerize, the color becomes progressively darker green in the manner similar to phthalocyanines. The polymerization is difficult to initiate and promote which indicates the formation of a large and complex nucleus such as the phthalocyanine nucleus by a large end group such as the phthalonitrile group.

These resins have properties that make them exceptionally suitable for structural resins. They have a maximum temperature stability in an oxygen-containing atmosphere of about 230° C. which represents a significant improvement over epoxy resins. Water resistance as measured by the water-soak method is better than that of epoxy resins.

The structural strength of the resins is comparable to that of epoxy and polyimide resins. These resins have many advantages over polyimides due to the adsence of solvents, being less hydroscopic, not being thermoplastic with a low glass-transition temperature and having better water resistance. Thus these resins promise to be an important new class of structural resins.

Although the properties of these resins are excellent, many applications require resins which have a higher temperature stability, a greater resistance to oxidative or chemical attack, lower combustibility, and higher char formation and which are self-extinguishing.

SUMMARY OF THE INVENTION

It is, therefore, an object of the present invention to provide a polyphthalocyanine resin having a water repellency greater than existing polyphthalocyanine resins without fluorine atoms.

Another object is to provide a resin which is thermally stable in an oxidative atmosphere at a temperature up to 310° C.

Yet another object of this invention is to provide a resin which is self-extinguishing and has a char formation greater than amide-bridged polyphthalocyanines.

A further object of this invention is to provide a resin which is more resistant to oxidative attack than epoxies and polyphthalocyanine resins prepared from amide-bridged bisorthodinitriles.

A still further object of this invention is to provide a resin which does not require a solvent system for its preparation and does not require a multicomponent system for preparation.

These and other objects are achieved by heating a bisorthodinitrile with alternating oxy and phenyl groups in the bridging chain thereby placing in the bridge the extremely stable oxygen-to-aromatic bond.

DETAILED DESCRIPTION OF THE INVENTION

The resins of the present invention are characterized as polyphthalocyanines primarily on the basis of the progressively darkening of the green color as the resins are formed. Also the phthalocyanine formation is a reasonable mechanism in view of the dinitrile end groups of the precursor. It is on this basis that the phthalocyanine formation is believed to be the principal reaction. Other cyano-addition reactions may also be present; however the resulting resin is a three-dimensional network polymer with exceptional uniformity in properties.

The resin with phthalocyanine nuclei has a structural formula:

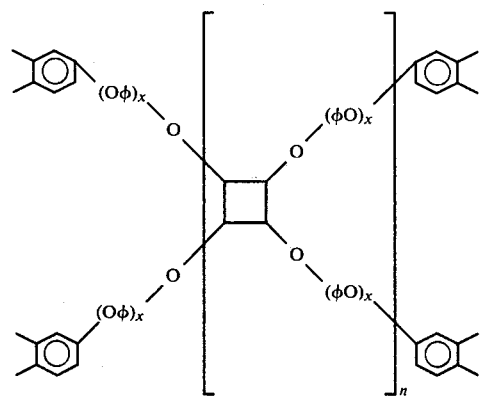

wherein n is any number, x is an integer from 1 to 10, the phenyl groups are attached at meta or para position, and ☐ is represented by the formula:

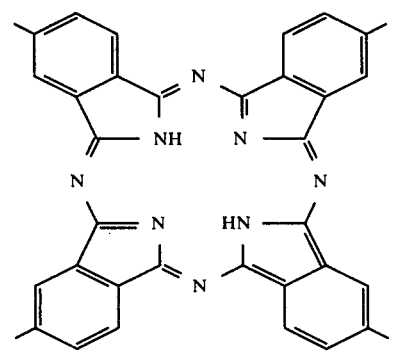

If the phthalocyanine has been co-ordinated by a metal or salt, the phthalocyanine nucleus is represented by ☐ and the formula is:

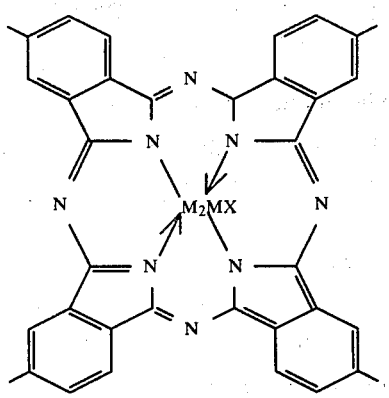

wherein M is a metal and MX is a metallic salt. Hereinafter, the resins of this invention are designated as: $(PcO_2(\phi O)_{2x})_n$ if neat; $(M.PcO_2(\phi O)_{2x})_n$ if coordinated with a metal; and $(MX.PcO_2(\phi O)_{2x})_n$ if coordinated with a metallic salt.

Resins with x from 2 to 5 represent the best combination of economy and ease of preparation. The most rigid and brittle resin is the one with x equal to one. Even though it is the most difficult to prepare, the resin x equal to one is the least expensive to prepare on account of the low cost of the starting monomer. As x increases the resins become more flexible, but also become more expensive on account of the increased cost of the starting materials. The preferred metals are copper, iron, zinc, and nickel due to the enhanced thermal stability of the resulting resins above 250° C. Examples of other metal which may be used are chromium, molybdenum, vanadium, beryllium, silver, mercury, tin, lead, antimony, calcium, barium, manganese, magnesium, cobalt, palladium and platinum. The preferred metallic salt is stannous chloride. This increases the reaction rate the most and has the least trouble with poor dispersion and voids caused by entrapped gas. These advantages occur only if the stannous chloride is dispersed by the method described hereinafter. Other suitable metallic salts include cuprous bromide, cuprous cyanide, cuprous ferricyanide, zinc chloride, zinc bromide, zinc iodide, zinc cyanide, zinc ferrocyanide, zinc acetate, zinc sulfide, silver chloride, ferrous chloride ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, stannous chloride hydrate, a complex of triphenylphosphine oxide and mixtures thereof. Additional examples of metals and salts are found in Mosher, Frank H. and Thomas, Arthur L. *Phthalocyanine Compounds* N.Y. Reinhold, 1963, p. 104–141.

The resins of the present invention are obtained by heating a bisorthodinitrile of the general formula:

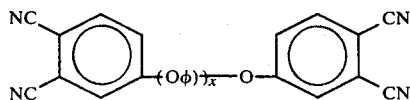

wherein x is an integer from 1 to 10 and the phenyl groups are attached at the meta or para position. The bisorthodinitriles are prepared by a nucleophilic substitution of the nitrosubstituent of 4-nitrophthalonitrile with an aromatic diol. The aromatic diols are easily prepared by an Ullman ether synthesis. Further discussion of this type of synthesis can be found in Williams, A. L. et al. *Solvent-Assisted Ullman Ether Synthesis. Reactions of Dihydric Phenols.* In Journal of Organic Chemistry 32: p. 2501-05. August 1967 and in Hammann, W. C. et al. *Synthesis of Seven New Polyphenyl Ethers.* In Journal of Chem. and Eng. Data 15(2): p. 352-5. 1970. The difficulty of initiating and promoting the neat polymerization of the bisorthodinitriles needed to obtain the resins of the present invention is greater than the considerable difficulty of polymerizing previously used bisorthodinitriles. This difficulty is particularly so with the bisorthodinitrile with x equal to 1. Resin preparation from this bisorthodinitrile without the inclusion of a salt or metal, especially stannous chloride, requires heating the bisorthodinitrile at about 305° C. for several days. Bisorthodinitriles with higher values for x can polymerize at lower temperatures; however, all require higher temperatures than the amide-bridged polyphthalocyanines. If the longer bisorthodinitriles are heated at their melting points, the polymerization requires several days to several weeks. Consequently, the preferred method of preparing neat polyphthalocyanines from bisorthodinitriles with a bridge length in excess of x equal to one is to heat the bisorthodinitrile at temperature from 240° C. to 305° C. The atmosphere can be oxygen containing, inert, or a vacuum. The heating is continued until the melt solidifies to an extremely hard material. The most preferred method of preparation comprises heating a bisorthodinitrile to about 200° C. and then slowly raising the temperature to about 260° to about 275° C. After melting, the viscosity starts to increase due to the onset of phthalocyanine formation which is called the B-stage. At the B-stage, the material can be cooled to a frangible solid and can be stored indefinitely without further reaction. The C-stage is obtained from the B-stage resin by breaking up the B-stage resin and heating the resin at a temperature from 240°–305° C. The preferred temperature for reacting the resin to the C-Stage is from 250° C. to 305° C. and the most preferred is from 270° C. to 290° C. The optimum cure for any particular resin at a particular temperature is determined empirically by testing the structural strength of samples over a range of cure times.

If a metal or salt is added, the polymerization temperature can be reduced from about 10° to about 20° C. without affecting the polymerization rate. If stannous chloride is added, the polymerization temperature can be reduced by about 40° C. without affecting the polymerization rate.

In adding a metal or salt to co-ordinate the phthalocyanine nuclei, the metal or salt is added in a stoichiometric amount while the bisorthodinitrile is molten or powdered. If the amount of metal or salt is less than stoichiometric, i.e., less than one equivalent per two equivalents of the bisorthodinitrile the resulting resin is not completely coordinated with the salt or metal. An amount in excess of stoichiometry would cause the resin to have unreacted metal or salt in it. Avoiding the presence of any unreacted salt or metal is particularly important with the synthesis of the present resins on account of the high temperatures needed for polymerization.

High temperatures further require a high degree of purity on account of the increased reactivity of all species present including the impurities. For example, metal oxides at temperatures above 280° C. can attack the benzene-ring structure. The preferred amounts of impurities are less than 100 ppm. However, impurities can be present in amounts up to 800 ppm without noticeably affecting the quality of the final resin.

As with previous polyphthalocyanine resins, the dispersion of the salt or metal is affected by the particle size. Since the resin is formed at such high temperatures, dispersion becomes particularly critical. Consequently, particle sized up to 1000 micrometers are preferred.

If stannous chloride is used to co-ordinate the resin, the stannous chloride must be introduced into the melt as stannous chloride dihydrate by the following method. The stannous chloride dihydrate ($SnCl_1.2H_2O$) is added as a melt or powder. If the phthalonitrile is a powder, the mixture is heated, while being stirred, to a temperature from the melting point to about 20° C. in excess thereof until all water is expelled from the mixture and if the phthalonitrile is molten, then the mixture is kept at the melt temperature until all water is expelled. The mixture is then reacted either to the B-stage or C-stage in the manner previously described.

Examples of the preparation of bisorthodinitriles and polyphthalocyanines of this invention are herein given. These examples are given by way of explanation and are not meant to limit the disclosure or the claims to follow in any manner.

EXAMPLE I

Synthesis of 1,3 Bis(3,4-Dicyanophenoxy) Benzene.

A mixture of 5.5 g (0.05 mol) of resorcinol, 17.3 g (0.10 mol) of 4-nitrophthalonitrile, 20.8 g (0.15 mol) of anhydrous potassium carbonate and 60 ml of dry dimethyl sulfoxide was stirred at 80°–90° C. for 5 hours under a nitrogen atmosphere. After cooling, the resulting dark mixture was poured into 300 ml of cold dilute hydrochloric acid solution. The solid precipitate which separated was washed with water until the washings were neutral. The product was then collected by suction filtration. Recrystallization from acetone-water yielded 10.7 g (60%) of the desired product, m.p. 183°–186° C.

EXAMPLE II

Synthesis of 4,4'-Bis(3,4-Dicyanophenoxy) Diphenyloxide.

A mixture of 2.1 g (0.010 mol) of 4,4'-dihydroxydiphenyl ether, 0.9 g (0.022 mol) of 50% aqueous sodium hydroxide, 25 ml of dimethyl sulfoxide and 5 ml of benzene was stirred at reflux under a nitrogen atmosphere for 5 hours. The water and benzene were removed with a Dean-Stark trap. After cooling, 3.9 g (0.022 mol) of 4-nitrophthalonitrile was added in one portion. The resulting mixture was stirred for 15 hours at room temperature under a nitrogen atmosphere and then poured into 200 ml of water. A large quantity (3.2 g) of the product separated from the aqueous solution and was collected by suction filtration. The aqueous solution was extracted with three, 75 ml portion of chloroform. The combined extract was washed with water, dried over anhydrous sodium sulfate, filtered and concentrated at reduced pressure to afford 1.1 g of crude product. The combined crude product was recrystallized from acetone-water to yield 3.8 g (85%) of product, m.p. 191°–193° C.

EXAMPLE III

Polymerization of 1,3 Bis(3,4-Dicyanophenoxy) Benzene.

The monomer (1.5 g, 4 mmol) was melted and heated at 250° C. for 6 days. The sample turned green but did not show any visual change in viscosity which indicated that polymer formation was progressing extremely slow. The temperature was then increased to 280° C. and the sample was heated at this temperature for 6 days. After the 4th day, gelation had occurred and the sample was heated an additional two days to ensure complete polymerization.

EXAMPLE IV

Polymerization of 1,3-Bis(3,4-Dicyanophenoxy) Benzene with Stannous Chloride.

Another sample containing 1.8 g (5 mmol) of the monomer and 0.45 g (2 mmol) of stannous chloride dihydrate was mixed and heated at 200° C. for 12 hours. After 20 minutes, the salt had dissolved and the melt had become extremely viscous. Gelation had occurred after 1 hour at 200° C. The dark green solid was then postcured at 225° C. for 8 hours and at 250° C. for 18 hours.

EXAMPLE V

Polymerization of 4,4'-Bis(3,4-Dicyanophenoxy) Diphenyloxide.

The monomer (1.2 g, 2.6 mmol) was melted and heated at 280° C. for 72 hours. The melt turned green immediately and had solidified after heating for 24 hours. The polymeric material was heated for an additional 48 hours at 280° C. to insure complete polymerization.

EXAMPLE VI

Polymerization of 4,4'-Bis(3,4-Dicyanophenoxy) Diphenyloxide.

Another sample containing 1.2 g (2.6 mmol) of the monomer and 0.26 g (1.2 mmol) of stannous chloride dihydrate was placed in an oven at 210° C. After the monomer melted, the sample started to turn green immediately. After only 5 minutes, the salt had dissolved and the medium was rapidly increasing in viscosity. Complete gelation had occurred after 15 minutes. The sample was heated at 210° C. for 19 hours and postcured at 240° C. for 24 hours.

Preliminary thermal stability tests show that the resins of Examples III to VI have excellent thermal stability at 310° C. in air. Combustion tests with a high-temperature flame shows that the resins of Examples III to VI are self-extinguishing and have a char yield from 75 to 85 weight percent of the sample weight. One-gram samples of resins prepared in the manner described in Examples III to VI were placed in water and had about 1.1 percent increase in weight due to water absorption. This amount makes these resins competitive to highly fluorinated resins in water absorptivity.

The test results demonstrates that the phenoxy bridge imparts exceptional thermal and oxidative stability to polyphthalocyanine resins. Further, this type of bridging chain imparts excellent resistance to water absorption to the resin. These properties make the resins especially suitable for high-temperature structural uses and as matrix resins for carbon fiber or graphite composites.

Obviously many modifications and variations of the present invention are possible in light of the above teachings. It is therefore to be understood that within the scope of the appended claims the invention may be practiced otherwise than as specifically described. What is claimed and desired to be secured by letters patent of the United States is:

1. A thermosetting resin which comprises a polyphthalocyanine having a repeating unit selected from the class consisting of $-(PcO_2(\phi O)_{2x})-$, $-(M.PcO_2(\phi O)_{2x})-$, $-(MX.PcO_2(\phi O)_{2x})-$, and mixtures thereof wherein x is 1 to 10, M is a metal selected from the class consisting of copper, magnesium, zinc, iron, cobalt, nickel, palladium, platinum, manganese, chromium, molybdenum, vanadium, beryllium, silver, mercury, aluminum, tin, antimony, calcium, barium, cadmium, and mixtures thereof, and MX is a salt selected from the class consisting of cuprous chloride, cuprous bromide, cuprous cyanide, cuprous ferricyanide, zinc chloride, zinc bromide, zinc iodine, zinc cyanide, zinc ferricyanide, zinc acetate, zinc sulfide, ferrous chloride, ferric chloride, ferrous ferricyanide, ferrous chloroplatinate, ferrous fluoride, ferrous sulfate, cobaltous chloride, nickel sulfate, nickel carbonate, stannic chloride, and mixtures thereof and the phenyl groups are attached at the meta or para position.

2. The resin of claim 1 wherein said polyphthalocyanine has said repeating unit of $-PcO_2(\phi O_2)_x-$ with x equaling 2 to 5.

3. The resin of claim 2 wherein X is 2.

4. The resin of claim 1 wherein said polyphthalocyanine has said repeating unit $-M.PcO_2(\phi O)_{2x}-$ with x equaling 2 to 5.

5. The resin of claim 4 wherein M is selected from the class consisting of copper, silver, iron and nickel.

6. The resin of claim 1 wherein said polyphthalocyanine has said repeating unit $-MX.PcO_2(\phi O)_{2x}-$ with x equaling 2 to 5 MX being selected from the class consisting of cuprous chloride, cuprous bromide, cuprous cyanide, cuprous ferricyanide, zinc chloride, zinc bromide, zinc iodine, zinc iodine, zinc cyanide, zinc ferricyanide, zinc acetate, zinc sulfide, ferrous chloride, ferric chloride, ferrous ferricyanide, ferrous chloroplatinate, ferrous fluoride, ferrous sulfate, cobaltous chloride, nickel sulfate, nickel carbonate, stannic chloride, and mixtures thereof.

7. The resin of claim 6 wherein MX is stannous chloride.

8. The resin of claim 1 wherein X is an integer from 6 to 10.

9. The resin of claim 8 wherein said polyphthalocyanine has said repeating unit selected from the class consisting of $-PcO_2(\phi O)_{2x}-$, $-M.PcO_2(\phi O)_{2x}-$, and mixtures thereof and M is selected from the class consisting of copper, silver, iron and nickel.

10. The resin of claim 8 wherein said polyphthalocyanine has said repeating unit $-SnCl_2.PcO_2(\phi O)_{2x}-$.

* * * * *